United States Patent Office 2,837,271
Patented June 3, 1958

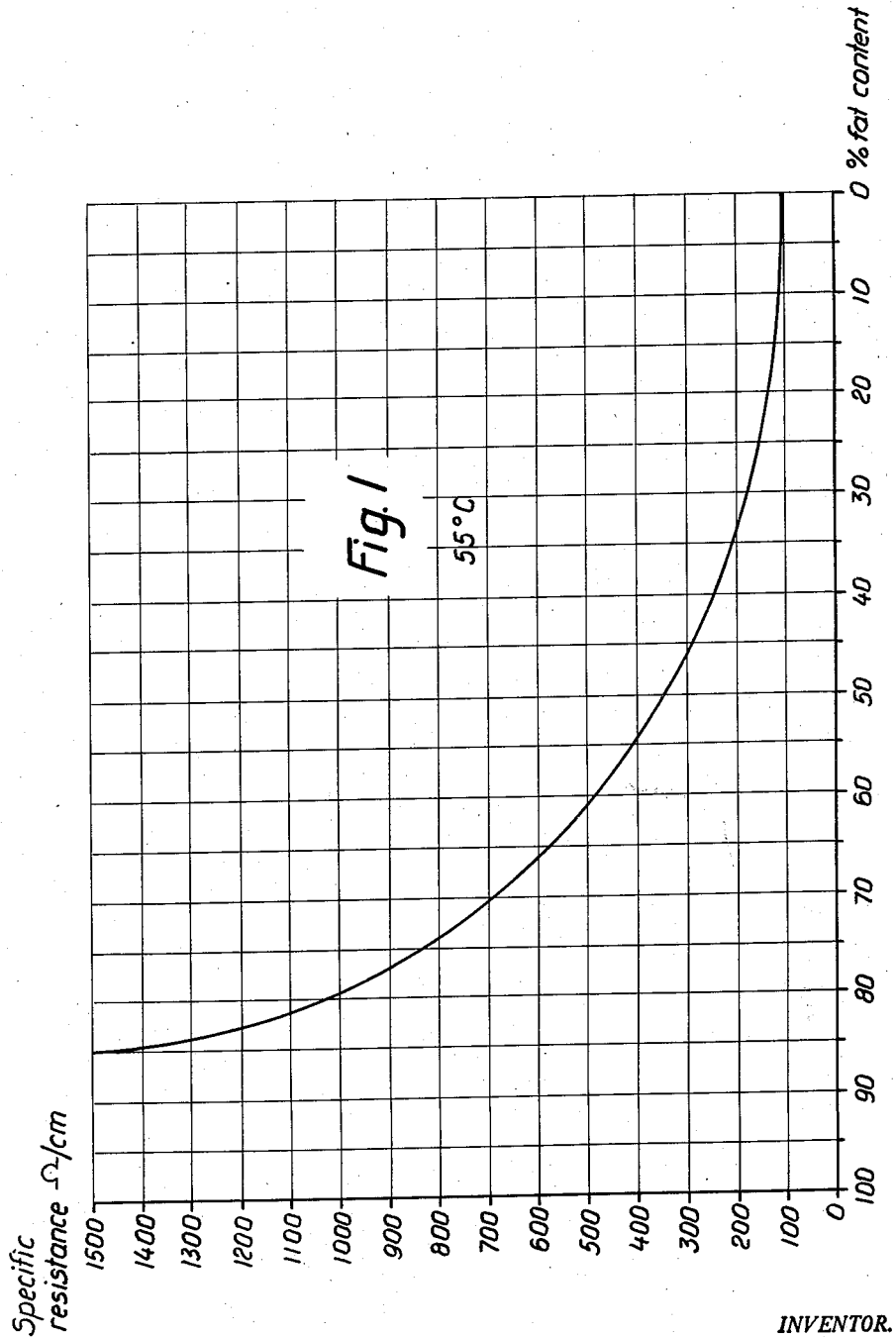

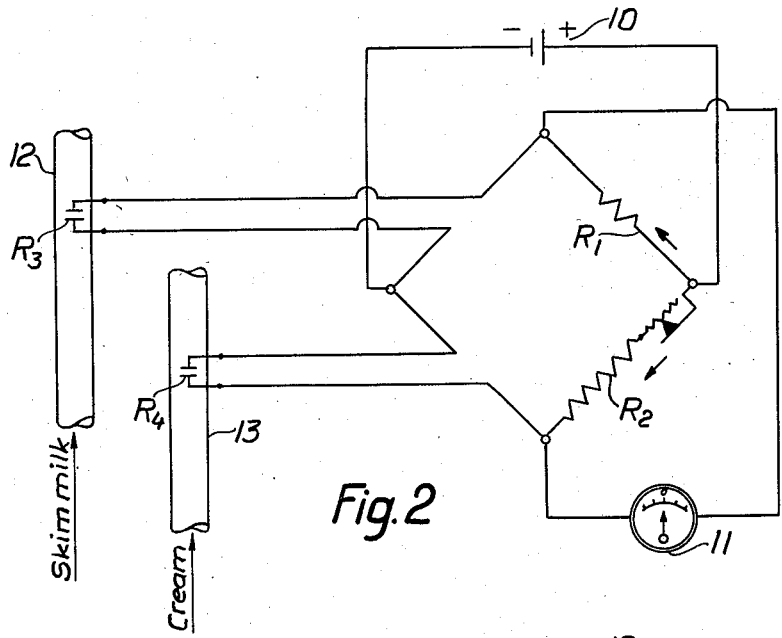
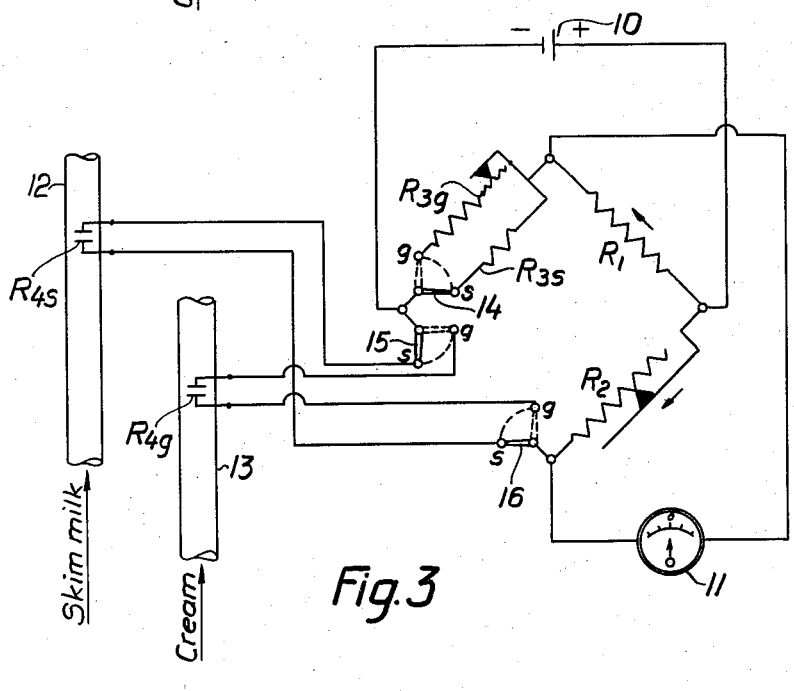

2,837,271

METHOD AND APPARATUS FOR REGULATING THE FAT CONTENT OF CENTRIFUGALLY SEPARATED CREAM

Folke Valentin Haglund, Johanneshov, Sweden, assignor to Aktiebolaget Separator, Stockholm, Sweden, a corporation of Sweden Application November 16, 1951, Serial No. 256,689

6 Claims. (Cl. 233—1)

The present invention relates to regulation of the fat content of cream when separating milk or cream continuously. It has particular reference to an improved method and apparatus for this purpose, which utilize the specific electrical resistances of the skim milk and cream, respectively.

In a copending application of Per Ake Dahlstedt, Serial Number 85,520, filed April 5, 1949, now Patent No. 2,628,023 dated February 10, 1953 there is disclosed a method and apparatus for the continuous regulation of the fat content of cream while separating milk or cream in a centrifuge. In accordance with the teachings of that application, the specific electrical resistances of skim milk and cream are determined, the skim milk and cream being discharged continuously and simultaneously from the centrifuge. The resistance values so obtained are compared to provide a measure of the fat content of the cream, and the cream concentrating power of the centrifugal separator is reglated in accordance with changes in the relative resistances of the skim milk and cream as revealed by the comparison.

The present invention has for its principal object to provide an improvement of this method and an improved apparatus for practicing it.

It has been discovered that in the separation of milk the relation between the specific electrical resistances of the skim milk and cream components will remain constant, provided that the cream in each instance has the same fat content and the skim milk is practically free of fat (i. e., has a maximum fat content of 0.06–.1%, which is the usual case with ordinary centrifugal separations of whole milk in dairies). This constant relation between the specific resistances holds true irrespective of the particular cow producing the milk, and the relation corresponds to an empirically-found value for each percentage of fat content in the cream. Experiments have shown that the specific electrical resistance of the milk or cream changes as its fat content changes, so indicated by the curve formed by plotting fat content against electrical resistance. With milk taken from another cow or from the same cow tested at another season, this curve may have a somewhat different appearance. However, such curves are mutually uniform in that the relation between the specific electrical resistances of, for example, cream of 85% concentration and skim milk, remains the same for the different curves. It may be pointed out that in the practical application of the invention, the fat content of the skim milk, being normally about 0.1%, is of no importance because the fat content of the cream is so much greater in magnitude, amounting to more than 80% in the manufacture of butter.

In the practice of the present invention, the regulation of the fat content of cream discharged from the centrifugal separator is carried out in such a way that the relation or ratio between the specific electrical resistances of the skim milk and the cream is determined immediately upon their discharge from the separator practically simultaneously. The correct relation between these resistances for a desired fat content of the cream, having been previously determined empirically, is utilized as the standard to which the ratio of electrical resistances is adjusted in order to secure cream of the desired fat content, the equalization of this ratio with the standard being accomplished by regulating the cream concentrating power of the separator.

The ratio of the electrical resistances of the skim milk and cream can, of course, be calculated mathematically from measured values. However, to obviate mathematical calculations, I prefer to use a Wheatstone bridge in which two resistance arms have the same resistance ratio as the empirically-found ratio betwen the specific electrical resistances of the skim milk and cream at the desired fat content of the cream. The resistance values of the other two arms of the bridge may be varied so that they will correspond, respectively, to the electrical resistances of the skim milk and cream discharged from the separator. The cream concentrating power of the separator can then be immediately adjusted according to the deflection of an indicating instrument, such as a galvanometer, of the Wheatstone bridge, until the indicator shows no deflection, thus indicating that the electrical resistance ratio of the skim milk and cream discharged from the separator is the correct ratio found empirically.

According to one embodiment of the invention, two arms of the Wheatstone bridge have the empirically-found electrical resistance ratio of skim milk and cream, and the other two arms contain, respectively, two equally calibrated measuring cells through which the skim milk and cream discharged from the centrifugal separator pass separately. When the indication of the instrument connected across the bridge shows zero deflection, the fat content of the cream discharged from the separator is at the desired value. With this arrangement, the bridge circuit can be electrically connected at all times, with the advantage that the fat content of the cream can be continuously controlled without the necessity of adjusting resistance arms of the bridge.

According to another embodiment, in one of a pair of arms of the Wheatstone bridge a fixed resistance and a variable resistance are arranged to be alternately connected. These resistances are adjustable to the empirically-determined ratio of the skim milk and cream resistances. The other of this pair of arms is arranged to alternately connect a skim milk measuring cell and a cream measuring cell, both equally calibrated and positioned in the respective outlets of the separator. The arms opposite this pair of arms contain a fixed and a variable resistance, respectively, the purpose of these resistances being to initially balance the bridge. The bride is first balanced with the skim milk cell and the empirically-determined skim milk resistance in the bridge circuit, and this cell and resistance are then disconnected and the cream measuring cell and the empirically-determined cream resistance are substituted, respectively, the initial values of the other resistances for bridge balance being maintained. If the bridge remains balanced, as evidenced by the indicating instrument connected across the arms, then the fat content of the cream being discharged from the separator is at the desired value. If adjustment of the cream concentrating power of the separator is required, the magnitude and direction of the deflection of the indicating instrument will be a guide for proper regulation.

If direct current is the source of electrical potential in these embodiments, then the phenomena of electrolysis will result in the measuring cells and disturb the balancing of the bridge. According to the invention, this disturbance is preferably avoided by using alternating current as the source of potential.

In these embodiments, both measuring cells should be calibrated quite equally so that they have the same electrical resistance constant (cell constant). While the arrangement of the resistances in the bridge arms does compensate somewhat for differences in the cell constants, the demand for accurate calibration can be avoided by utilizing a single cell as a measuring cell for both the skim milk and the cream. In this case, it is necessary to thoroughly flush the single cell after each change, before reading the indicating instrument.

The present invention, therefore, provides an arrangement and procedure for regulating the fat content of cream being continuously discharged from a separator. In practice, one can choose from among the different suggested refinements in accordance with the demands of local conditions.

A better understanding of the invention will be had from the following description taken in conjunction with the accompanying drawings, in which:

Fig. 1 shows a curve plotted from data obtained empirically and representing the specific resistance of milk-cream in relation to its fat content;

Fig. 2 is a circuit diagram illustrating one embodiment of the invention;

Fig. 3 is a circuit diagram illustrating another embodiment of the invention;

Figure 4:
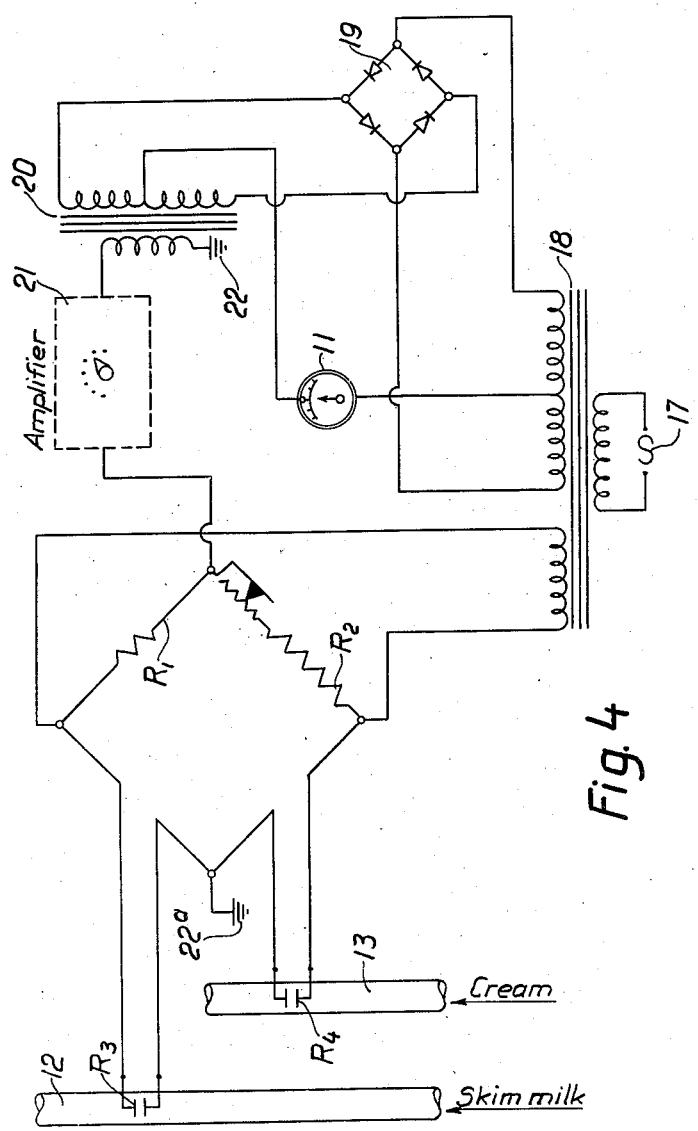
Figure 5:
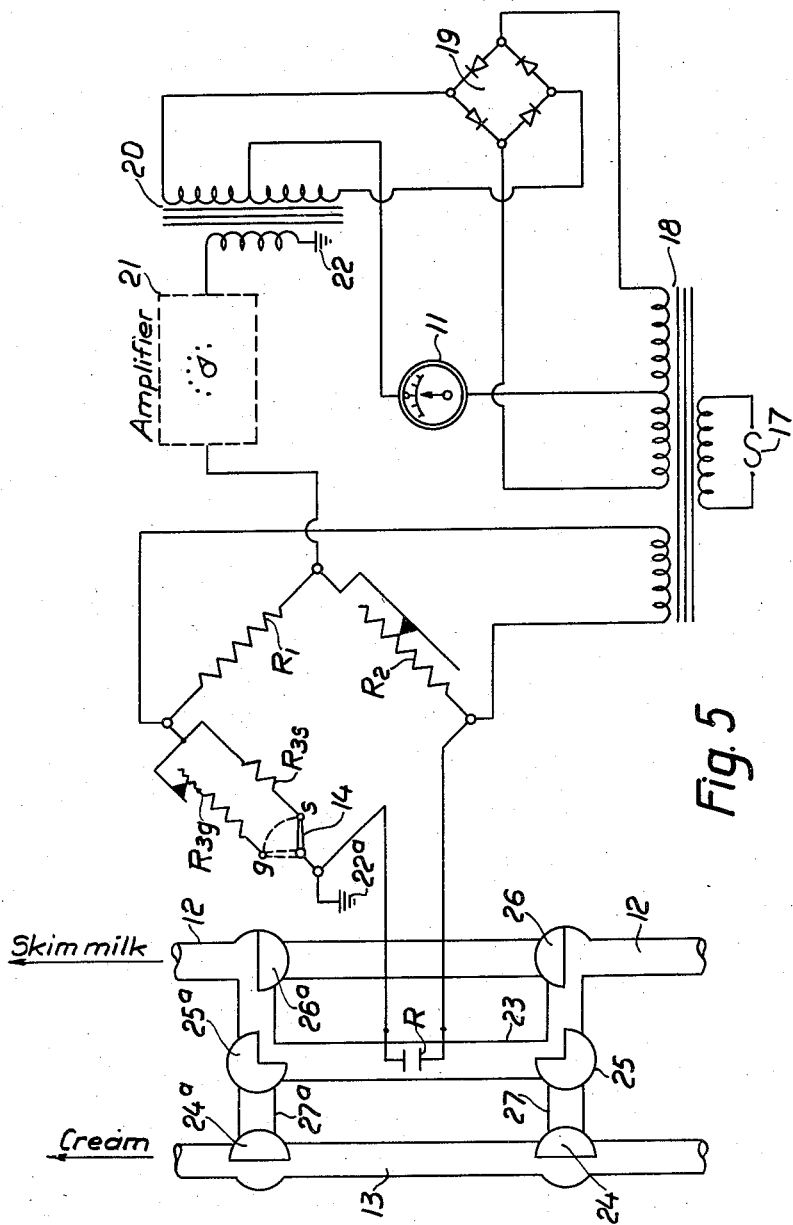

Fig. 4 is a circuit diagram illustrating an arrangement in accordance with Fig. 2 which is supplied by a source of alternating current; and Fig. 5 is a circuit diagram illustrating an arrangement in accordance with Fig. 3 which is supplied by a source of alternating current, and also showing a changeover device in the skim milk and cream outlet pipes so as to permit the utilization of a single measuring cell.

The empirical data for the curve shown in Fig. 1 was obtained under temperature conditions kept constant at 55° C. The temperature influences the value of specific resistance, and for this reason it is necessary that it remain constant during the running of the tests. A corresponding curve lying somewhat below the curve shown in Fig. 1 is obtained for higher temperatures, and a curve somewhat higher is obtained at lower temperatures. Similarly, the salt content of the serum affects specific resistance, a higher salt content, for example, resulting in a curve somewhat lower than the curve obtained for Fig. 1.

If the electric resistance is measured between two electrodes immersed in cream, whole milk, or skim milk, one will find that the resistance is greatest for cream, less for whole milk, and least for skim milk. This can be explained by the fact that the milk serum is electrically conductive while the fat particles are substantially non-conductive. The presence of a large proportion of fat particles in cream, for example, results in the displacement of a corresponding volume of the conductive serum, thereby reducing the component of the cream which is conductive. Obviously then, as the fat content of the cream or milk is increased, a corresponding reduction in conductivity takes place, so that the electrical resistance increases as the fat content of the material increases.

In most countries it is stipulated by law that butter must have a maximum water content of 16%. It is economically advantageous for the dairy producers to keep as closely as possible to this maximum value. Accordingly, in the production of butter by the method wherein the cream is concentrated in centrifugal separators (for example, in two or more steps) to a given fat content for the butter desired, and then the concentrated cream is phase-reversed into butter by working and cooling, it is usual to so concentrate the cream that 15.8% of serum remains.

It has been found that the relationship between the specific electric resistance of cream (for example, with a serum content of 15.8%) and the specific resistance of skim milk is constant if the temperature is the same in the cream and skim milk outlets of the centrifuge at the last (concentrating) step. Small variations in the normal clean skimming have practically no influence in this empirically-found radio.

Referring now to Fig. 2, two arms $R_1$ and $R_2$ of a Wheatstone bridge have a resistance ratio corresponding to the empirically-found ratio between the specific electrical resistances of the skim milk and cream at the desired fat content. Resistance $R_2$ is adjusted so that the ratio $R_1:R_2$ can be varied to match the empirical ratio for the particular percentage of fat content desired in the cream. For example, in the separation of cream having an 80% fat content, the ratio $R_1:R_2$ will differ from the ratio used in separating a cream of lower fat content, in view of the lower resistance value $R_2$ for the cream of lower fat content. The other two resistance elements of the bridge are two equally calibrated measuring cells $R_3$, $R_4$ arranged in the centrifuge outlets 12, 13 for the skim milk and the cream, respectively.

The skim milk passing through the skim milk cell $R_3$ will result in the corresponding arm of the bridge having a resistance equal to the specific resistance of the skim milk divided by the resistance constant of the cell $R_3$. Similarly, the "cream" arm of the Wheatstone bridge will have a resistance equal to the specific resistance of the cream flowing through cell $R_4$ divided by the resistance constant of the same cell. ($R_3$ and $R_4$ indicate the cells proper and also their resistance.) The bridge is energized by a source of D. C. potential 10, and a galvanometer or other indicating means 11 is connected across the resistance arms $R_1$—$R_2$.

In the operation of the device, the arm $R_2$ is adjusted to provide the ratio $R_1:R_2$ corresponding to the empirical ratio for the desired fat content of the cream. The skim milk and cream are discharged through their respective outlets 12, 13 of the centrifugal separator. If the bridge is balanced, there will be no deflection of the galvanometer 11 and hence the fat content of the discharging cream will be of the percentage desired. This is shown mathematically as follows:

If:

$$\frac{R_1}{R_2} = \frac{\text{specific electrical resistance of skim milk}}{\text{specific electrical resistance of cream with the desired fat content}}$$

then, if the cream passing through cell $R_4$ is at the desired fat content:

$$\frac{R_1}{R_2} = \frac{R_3}{R_4}$$

and there will be no deflection of the galvanometer.

If there is a deflection of the galvanometer 11 in one direction or the other, it can be readily determined in which direction the correction should be made, that is, whether to increase or decrease the cream concentrating power of the separator.

Any other suitable indicating instrument may be used, in place of the galvanometer 11. Also, either of the resistances $R_1$, $R_2$ can be made variable to adjust the ratio $R_1:R_2$ for different fat contents of the cream.

In Fig. 3 there is shown another embodiment of the invention, wherein one arm of the bridge comprises two resistances $R_{3s}$ and $R_{3g}$ arranged to be alternately connected into the bridge by means of switch 14. These resistances are proportioned to provide the empirically-found ratio between the specific electrical resistances of the skim milk and cream at the desired fat content, $R_{3g}$ representing cream resistance and $R_{3s}$ representing skim milk resistance. One of these resistances (e. g., $R_{3g}$) is adjustable for the same reason that $R_2$ was made adjustable in Fig. 2. In the adjacent arm of the bridge two switches 15 and 16 are provided so as to enable the skim milk cell $R_{4s}$ and the cream cell $R_{4g}$ to be alternately connected, as will be seen from the drawing. The opposite arms of the bridge contain a fixed resistance $R_1$ and a variable resistance $R_2$, the purpose of these resistances being to balance the bridge as will be hereafter explained. It will be evident from a study of Fig. 3 that resistance $R_{3s}$ is connected into the bridge when the skim milk measuring cell $R_{4s}$ is connected into the bridge, and resistance $R_{3g}$ is similarly arranged to be connected into the bridge simultaneously with the measuring cell $R_{4g}$ through which the cream passes. The cells $R_{4s}$ and $R_{4g}$ are equally calibrated.

In the operation of this embodiment, the skim milk cell $R_{4s}$ is connected by moving switches 15 and 16 to the pole positions marked S on the respective switches. Resistance $R_{3s}$ is connected in the other arm by moving switch 14 to its corresponding pole position shown as S. Resistance $R_2$ is then adjusted until the galvanometer 11 shows a zero deflection. Switches 14, 15 and 16 are then moved to their alternative pole positions G, thereby disconnecting resistance $R_{3s}$ and cell $R_{4s}$ from the bridge circuit. The cream cell $R_{4g}$ and resistance $R_{3g}$ are now connected in their respective bridge arms. If the galvanometer deflection is now zero, then the fat content of the cream being discharged through outlet 13 is in accordance with the desired value. If the situation is otherwise, the direction of the deflection of the galvanometer 11 will be an indication of how the cream concentrating power of the separator is to be changed in order to obtain cream with the required fat content. Mathematically, the complete operation can be described as follows:

$R_{4s}$ and $R_{4g}$ indicate the resistances of the respective cells. In the initial part of the operation, resistance $R_2$ is regulated with regard to the conductivity of the skim milk actually being discharged from the separator. Thus, $$\frac{R_1}{R_2}=\frac{R_{3s}}{R_{4s}}$$

In the final operation on the bridge, when resistance $R_2$ is maintained at the value established in the initial balancing step, the result is $$\frac{R_1}{R_2}=\frac{R_{3g}}{R_{4g}}$$

if the fat content of the cream being discharged is at the desired value. It follows that $$\frac{R_{3s}}{R_{4s}}=\frac{R_{3g}}{R_{4g}} \text{ or } \frac{R_{3s}}{R_{3g}}=\frac{R_{4s}}{R_{4g}}$$

In the arrangements illustrated in Figs. 2 and 3, the source of energy 10 for the Wheatstone bridge is direct current. Some electrolysis will take place in the measuring cells as a result, and this phenomena will have a disturbing effect in determining bridge balance. Preferably, to avoid this inconvenience, a source of alternating current can be used.

Accordingly, in Fig. 4 there is shown an embodiment similar to that of Fig. 2 but arranged to be supplied with alternating current from source 17 connected to the bridge circuit. The circuit comprises transformer 18, bridge rectifier 19, transformer 20, and amplifier 21. The indicating instrument 11 is connected between a tap on the primary of transformer 20 and a tap on the secondary of transformer 18. Part of the secondary winding of transformer 18 is connected across opposite corners of the bridge, and the secondary of transformer 20 and the amplifier 21 are connected across the other opposing corners of the bridge by ground connections 22—22ª. The arrangement of circuit elements is well known in the art and requires no explanation. In operation, bridge balance is secured in the same manner as in the Fig. 2 embodiment.

Similarly, in Fig. 5 there is disclosed an embodiment generally according to Fig. 3, wherein the bridge is supplied with an A. C. source 17. The circuit for the alternating current source and the indicating instrument is the same as in Fig. 4. In this embodiment the skim milk discharge line 12 and the cream discharge line 13 are arranged to be connected alternately through a suitable valve system with a single measuring cell R located in pipe 23. The valve system, shown schematically, comprises valves 24, 25 and 26 in the pipes 13, 23 and 12, resepctively, where they join an interconnecting pipe 27, and complementary valves 24ª, 25ª and 26ª in an interconnecting pipe 27ª at the opposite end of cell pipe 23. Each set of three valves may be formed by a three-way cock. In their positions as illustrated in Fig. 5, the valves connect the skim milk pipe 12 to the cell R. However, by turning the valves 24, 25, 26 counterclockwise and the valves 24ª, 25ª, 26ª clockwise, the connections are reversed so as to connect cream pipe 13 to the cell R. If a proper bridge balance is to be obtained, the cell R must be thoroughly flushed prior to each instrument reading following a shifting of the valves. As pointed out previously, this arrangement of a single cell may be used to avoid any error caused by deviation in the calibration of the two measuring cells.

It will be noted that the adjustable resistances shown in Figs. 2 and 4 and in Figs. 3 and 5 are so arranged as to compensate for deviations in the calibration of the measuring cells $R_3$—$R_4$ and $R_{4s}$—$R_{4g}$, respectively. It is thus not absolutely necessary that the measuring cells shall have the same cell constant, unless of course a finer, more accurate adjustment is desired.

It will be understood that the process of the invention comprises the steps of comparing the ratio between the specific electrical resistances of the skim milk and cream discharged substantially simultaneously from the centrifugal separator, with an empirically-determined ratio between the electrical resistances of the skim milk and cream at a predetermined fat content of the cream, and adjusting the cream concentrating power of the separator to counteract variations of the first ratio from the second ratio. While I have illustrated several forms of apparatus for performing the above-mentioned comparing step, it will be apparent that such step may be performed in other ways. For example, a measure of the ratio $R_3:R_4$ may be established by including the resistance cells $R_3$—$R_4$ in separate circuits each having an ammeter calibrated to indicate directly the resistance of the liquid passing through the corresponding cell; and the ratio thus indicated may be compared with the empirical ratio by the operator of the centrifuge, who adjusts it to maintain the two ratios substantially equal. The adjustment of the centrifugal separator may, if desired, be effected automatically under control of an instrument, such as galvanometer 11, indicating variations of the ratio $R_3:R_4$ from the empirical ratio $R_1:R_2$, as by arranging contacts at opposite sides of the galvanometer pointer at its zero position and including these contacts in a control circuit for adjustment of the cream concentrating power of the centrifuge. Such an arrangement is illustrated in a patent of D. F. Ayres, No. 2,542,456, dated February 20, 1951. When the adjustment of the separator is thus effected automatically, the galvanometer 11 or other instrument responding to a condition of unbalance in the Wheatstone bridge, and which controls the circuit for adjusting the separator, is here regarded as an electrical potential indicator even though it indicates only indirectly by operation of the adjustment means of the separator.

The resistance cell means R, $R_3$, $R_4$, etc., may be of any conventional design. In Figs. 2, 4 and 5, the cell means are shown permanently connected into the Wheatstone bridge by means of simple wiring, while in Fig. 3 the cell means $R_{4s}$ and $R_{4g}$ are alternately connected into the bridge by means comprising the switches 15 and 16.

I claim:

1. In the continuous separation of a milk product into cream and skim milk components by means of a centrifugal separator, the method of regulating the fat content of the separated cream component, which comprises comparing the ratio between the specific electrical resistances of the skim milk and cream discharged substantially simultaneously from the separator, with a predetermined ratio between the electrical resistances of the skim milk and cream at a predetermined fat content of the cream, adjusting the cream concentrating power of the separator to counteract variations of said first ratio from the second ratio, and varying said predetermined ratio with variations in the desired fat content of the cream.

2. In the continuous separation of a milk product into cream and skim milk components by means of a centrifugal separator, the method of regulating the fat content of the separated cream component, which comprises establishing a measure of the ratio between the specific electrical resistances of the skim milk and cream discharged substantially simultaneously from the separator, regulating the cream concentrating power of the separator to maintain said ratio substantially equal to a predetermined ratio between said resistances at the desired fat content of the cream component, and varying said predetermined ratio with variations in the desired fat content of the cream.

3. Apparatus for use in regulating the fat content of cream discharged from a centrifugal separator having separate skim milk and cream outlets, which comprises resistance cell means, pipes communicating with the cell means for passing separately therethrough skim milk and cream discharged from the separator, a Wheatstone bridge having four resistance arms including two resistors maintained at predetermined values proportioned substantially in the ratio of the electrical resistances of the separated skim milk and cream at a predetermined fat content of the cream, means for connecting the resistance cell means into at least one of said arms which does not include either of said resistors, the bridge having two pairs of opposing corners between which the resistance arms are connected, an alterating current source connected across one pair of opposing corners, and an electrical potential indicator connected across the other pair of corners.

4. In combination with cream and skim milk discharge pipes of a centrifugal separator, a resistance cell, valve mechanism connected between the pipes and the cell and operable to pass cream and skim milk from said pipes alternately through the cell, a Wheatstone bridge having a pair of resistance elements forming two adjacent resistance arms of the bridge, one of said resistance elements being a variable resistance element, said cell forming a third resistance arm of the bridge, a pair of resistors proportioned in substantially the same ratio as the electrical resistances of the separated cream and skim milk at a predetermined desired fat content of the cream, means for interchangeably connecting said resistors into the bridge as the fourth resistance arm thereof, the bridge having two pairs of opposed corners between which said arms are connected, a current source connected across one pair of opposed corners, and an electrical potential indicator connected across the other pair of corners, whereby any variation in the ratio of the electrical resistances of the separated cream and skim milk relative to said first ratio is shown by the indicator.

5. Apparatus for use in regulating the fat content of cream discharged from a centrifugal separator having separate skim milk and cream outlets, which comprises resistance cell means, pipes communicating with the cell means for passing separately therethrough skim milk and cream discharged from the separator, a Wheatstone bridge having four resistance arms including two resistors maintained at predetermined values proportioned substantially in the ratio of the electrical resistances of the separated skim milk and cream at a predetermined desired fat content of the cream, one of said resistance arms, other than an arm including said cell means, being a variable resistor, means for connecting the resistance cell means into at least one of said arms which does not include either of said resistors, the bridge having two pairs of opposing corners between which the resistance arms are connected, a current source connected across one pair of opposing corners, and an electrical potential indicator connected across the other pair of corners, whereby any variation in the ratio of the electrical resistances of the separated cream and skim milk relative to said first ratio is shown by the indicator.

6. Apparatus according to claim 5, in which said resistance cell means comprise a single cell, the apparatus also including valve mechanism in the pipes and operable to pass the two liquids alternately through the cell.

References Cited in the file of this patent

UNITED STATES PATENTS

| | | |
|---|---|---|
| 1,450,023 | Edelman | Mar. 27, 1923 |
| 1,701,331 | Merrill | Feb. 5, 1929 |
| 1,951,035 | Parker | Mar. 13, 1934 |
| 2,228,078 | Gulliksen | Jan. 7, 1941 |
| 2,565,121 | Clardy | Aug. 21, 1951 |
| 2,628,023 | Dahlstedt | Feb. 10, 1953 |

FOREIGN PATENTS

| | | |
|---|---|---|
| 48,013 | France | June 29, 1937 |